United States Patent [19]
Hale

[11] Patent Number: 6,116,065
[45] Date of Patent: *Sep. 12, 2000

[54] ANTI-THEFT DEVICE FOR AIRCRAFT

[75] Inventor: Charles Richard Hale, Sharon, Pa.

[73] Assignee: Winner Aviation Corporation, Sharon, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/133,695

[22] Filed: Aug. 13, 1998

[51] Int. Cl.$^7$ ................................................. F16H 57/00
[52] U.S. Cl. ............................... 70/200; 70/209; 70/14; 244/224; 180/90
[58] Field of Search ................................. 70/14, 57, 58, 70/198–200, 209, 225, 226, 237, 238; 244/224, 121, 1 R; 180/90

[56] References Cited

U.S. PATENT DOCUMENTS

| | | |
|---|---|---|
| D. 289,491 | 4/1987 | Johnson . |
| D. 306,252 | 2/1990 | Johnson . |
| D. 312,202 | 11/1990 | Wang . |
| 1,364,539 | 1/1921 | Baker et al. . |
| 3,664,164 | 5/1972 | Zaidener . |
| 3,898,823 | 8/1975 | Ludeman ................................. 70/200 |
| 4,103,524 | 8/1978 | Mitchell et al. . |
| 4,475,366 | 10/1984 | Marneris .............................. 70/200 X |
| 4,738,127 | 4/1988 | Johnson ................................. 70/209 |
| 4,747,279 | 5/1988 | Solow . |
| 4,856,308 | 8/1989 | Johnson . |
| 4,887,443 | 12/1989 | Wang . |
| 4,935,047 | 6/1990 | Wu . |
| 4,961,331 | 10/1990 | Winner . |
| 5,062,282 | 11/1991 | Rong ........................................ 70/209 |
| 5,082,213 | 1/1992 | Torres ................................. 70/200 X |
| 5,121,617 | 6/1992 | Chen ....................................... 70/209 |
| 5,297,406 | 3/1994 | Lin . |
| 5,353,614 | 10/1994 | Anderson . |
| 5,381,679 | 1/1995 | Cummins . |
| 5,454,240 | 10/1995 | Whitney . |
| 5,537,847 | 7/1996 | Dalton et al. . |
| 5,582,363 | 12/1996 | Davis ................................. 70/200 X |
| 5,613,383 | 3/1997 | Banez . |
| 5,704,233 | 1/1998 | Farshad ............................. 70/199 X |
| 5,713,539 | 2/1998 | Russ et al. .......................... 70/200 X |
| 5,724,838 | 3/1998 | Alicea ................................. 70/199 X |
| 5,908,178 | 6/1999 | Sandhagen ............................. 244/224 |
| 5,953,941 | 6/1999 | Freund ................................. 70/200 X |

FOREIGN PATENT DOCUMENTS

| | | |
|---|---|---|
| 402771 | 12/1967 | Australia . |
| 593423 | 8/1925 | France ..................................... 70/200 |
| 2718291 | 10/1978 | Germany . |
| 142638 | 9/1998 | Japan . |
| 1107012 | 3/1968 | United Kingdom . |
| 1554593 | 10/1979 | United Kingdom . |
| 2039840 | 8/1980 | United Kingdom . |
| 2246105 | 1/1992 | United Kingdom .................... 70/209 |

*Primary Examiner*—Suzanne Dino Barrett
*Attorney, Agent, or Firm*—Vickers Daniels & Young

[57] ABSTRACT

An anti-theft device for precluding the flying of an airplane comprises a pair of arm members telescopically interengaged and having axially outwardly open U-shaped hooks for engaging with two flight control components in the cockpit of an airplane to preclude the displacement of the elevators, ailerons or rudder necessary to fly the airplane. The anti-theft device is releasably locked between the flight control components.

25 Claims, 11 Drawing Sheets

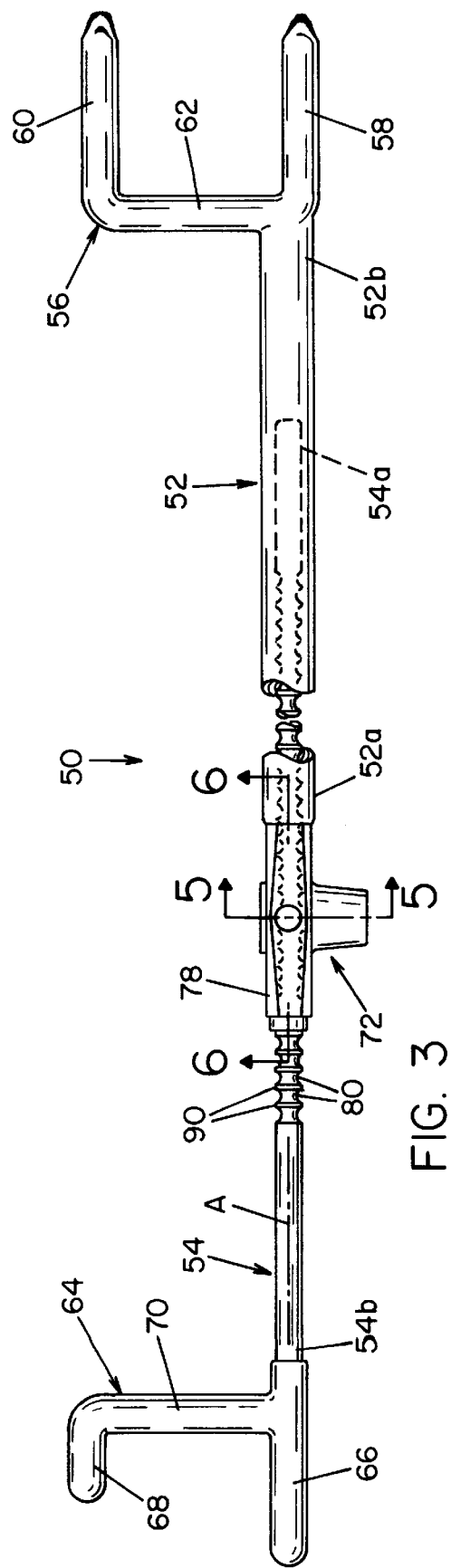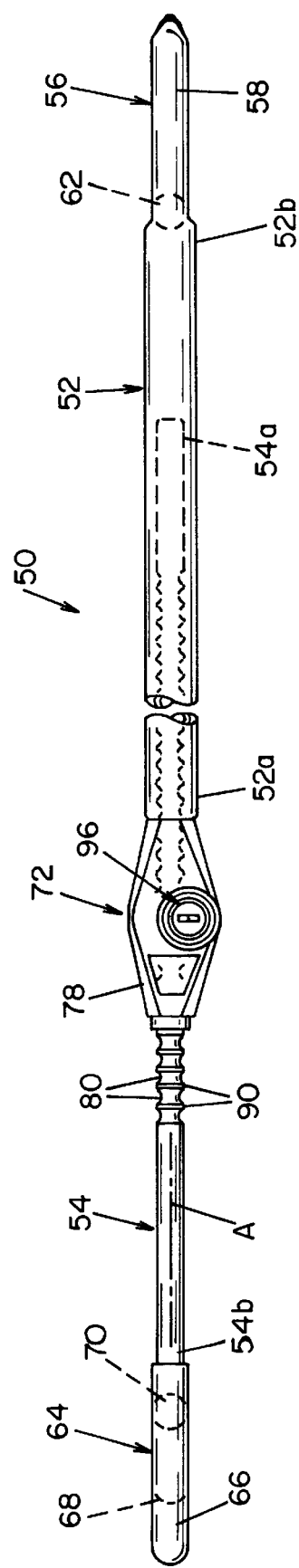
FIG. 3
FIG. 4

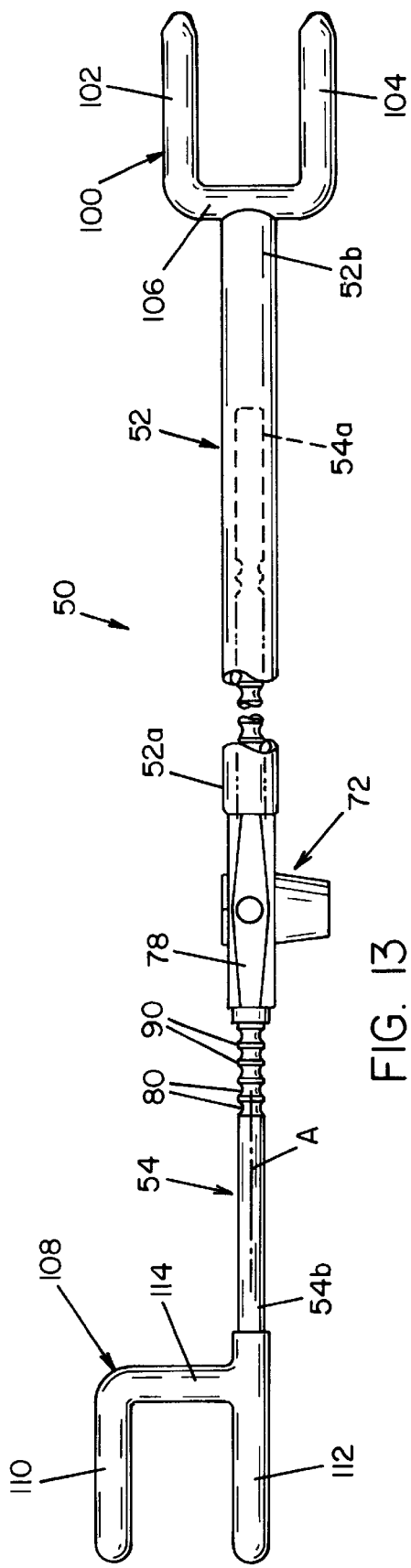
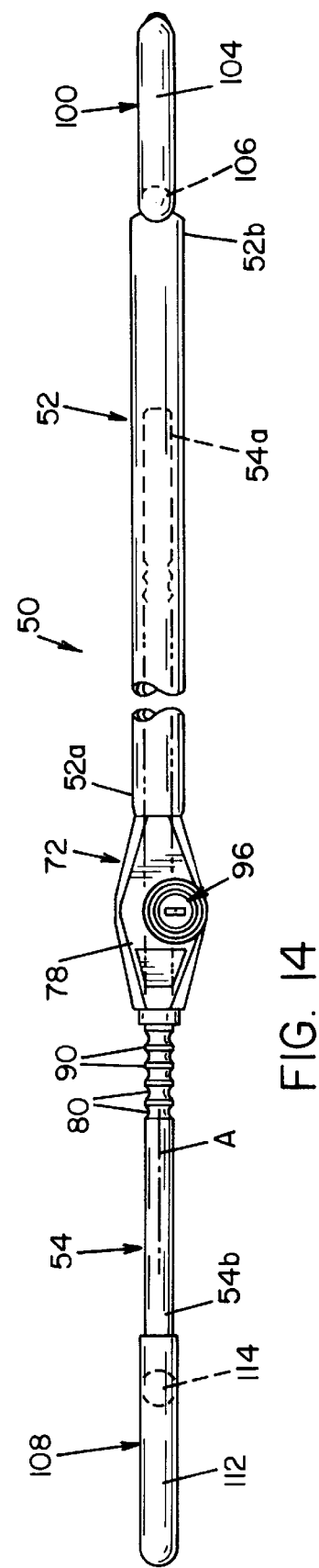
FIG. 13
FIG. 14

ANTI-THEFT DEVICE FOR AIRCRAFT

BACKGROUND OF THE INVENTION

This invention relates to the art of security devices and, more particularly, to an anti-theft device mountable between flight control components in the cockpit of an airplane to preclude unauthorized operation thereof.

Small, propeller driven and jet aircraft are often parked and left unattended outside in a remote area of a large airport, or outside at smaller, local airports, and in both cases there is very little traffic in the way of individuals in the area. Furthermore, there generally is no provision for security personnel to watch such unattended aircraft. Even if the owner of an aircraft normally parks in a hanger, there are instances where the aircraft is temporarily parked outside the hanger and left unattended, or towed or taxied from the hanger to a maintenance area in which the aircraft is left unattended pending the inspection, performance of maintenance and the like by maintenance personnel. Often, hangers are left open. In these and other situations, such aircraft is subject to unauthorized use or operation as well as theft, especially at smaller airports where there is minimal air traffic and thus more than ample opportunity to steal or take a joy ride in the aircraft. Indeed, theft of aircraft is a growing problem and is perhaps most prevalent in Southwestern areas of the United States and in Mexico and in connection with the illegal trafficking of drugs into the United States.

Some smaller aircraft have key operated ignition systems in which the wires can be readily crossed if necessary to enable operation of the engine of the aircraft. However, in connection with such small aircraft, owners often leave the key in place, especially when the aircraft has been parked in a maintenance area, whereby crossing of wires is not necessary to operate the aircraft. Moreover, some owners replace the key switch with a toggle switch and many aircraft as manufactured do not have a key operated switch and are operable merely by actuating a toggle switch. While small aircraft are often tethered to the ground, such tethering is primarily for the purpose of maintaining the aircraft in place during high winds and is not intended to deter theft or unauthorized operation of the aircraft. Indeed, such tethering arrangements include rope or other lines which are tied in place or provided with mechanical spring clasps or the like and, thus, are readily cut or detached from the aircraft.

It has been proposed, as shown for example in U.S. Pat. No. 4,167,862 to Gould and in my co-pending patent application Ser. No. 995,529 filed Dec. 22, 1997 to provide a blade of an airplane propeller with a removable device forming an eccentric weight so as to preclude operation of the aircraft. While such devices are operable for the intended purpose, they are limited to use with propeller driven aircraft. Furthermore, if a would-be thief angered for example by his or her inability to steal the airplane, throttles the engine to a high RPM, the out-of-balance condition caused by the eccentric weight can cause serious damage to the engine and/or other component parts of the aircraft resulting in costly repairs to the owner.

SUMMARY OF THE INVENTION

In accordance with the present invention, an anti-theft attachment is provided which can be easily and readily mounted in the cockpit of an airplane to engage flight control components of the aircraft against the displacement thereof necessary for flying the aircraft. In this respect, for example, the device can be connected between the steering yoke and rudder-brake pedal of an aircraft to render the flight control components inoperable and, in connection with an aircraft having twin steering yokes, the device can be connected between the steering wheel components thereon to preclude the rotation thereof necessary to control flight of the aircraft. Further in accordance with the invention, the anti-theft device for this purpose includes a pair of arm members extendable and retractable relative to one another and having outer ends terminating in outwardly open U-shaped hooks. The hooks are adapted, for example, to receive the steering yoke and a rudder-brake pedal of the aircraft therein and to be extended relative to one another so as to displace the steering yoke and rudder-brake pedal to positions in which flying of the aircraft is not possible. The arms of the device are adapted to be releasably locked in the extended position, whereby the aircraft is secured against unauthorized operation and flight in that either the rudder and elevators at the tail of the aircraft are pinned against operation, or the elevators are so pinned while the brake is applied to one of the wheels of the aircraft. In the alternative arrangement mentioned above in which the device engages between the steering wheel components on the steering yokes, the outwardly open hooks engage the laterally outer sides of each of the steering wheels which precludes rotation thereof and thus relative displacement of the ailerons on the wings necessary for flying the aircraft. Preferably, the two arm members are coaxial, telescopically interengaging tube and rod members adjustable in the direction of extension and retraction and locked against retraction when in the operative positions thereof, thus to optimize security of the aircraft against theft. The lock is key operated and preferably uses a key other than the ignition or door key for the aircraft.

It is accordingly an outstanding object of the present invention to provide an improved anti-theft device for aircraft.

Another object is the provision of an anti-theft device of the foregoing character which is operable to render flight control components of the aircraft inoperable, or to render a flight control component or components inoperable while applying the brake to one of the aircraft's wheels.

Yet another object is the provision of an anti-theft device of the foregoing character which is mountable in the cockpit of an aircraft between flight control components therein so as to preclude the displacements of the flight control components necessary for flying the aircraft.

Still another object is the provision of an anti-theft device of the foregoing character which is operable to engage between a steering yoke and a rudder controlling pedal component of an aircraft or, alternatively, between a steering yoke and a brake controlling pedal component or, alternatively between the steering wheel components on steering yokes of an aircraft having twin steering yokes so as to render the respective steering components inoperable for flying the aircraft and to apply the brake of one of the aircraft wheels when the brake controlling pedal is engaged.

Yet a further object is the provision of an anti-theft device of the foregoing character comprising a pair of arm members interengaged for displacement between extended and retracted positions relative to one another and having opposite ends terminating in outwardly open U-shaped hooks for interengaging with flight control components of an aircraft to preclude the displacement thereof necessary to fly the aircraft, and having a key operated locking arrangement for releasably holding the arms in the extended positions thereof.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 3 is plan view of an anti-theft device according to the invention;

FIG. 4 is a front elevation view of the anti-theft device shown in FIG. 3;

FIG. 13 is a plan view of still another embodiment of an anti-theft device according to the invention; and, FIG. 14 is a front elevation view of the anti-theft device shown in FIG. 13.

DESCRIPTION OF PREFERRED EMBODIMENTS

Figure 1:
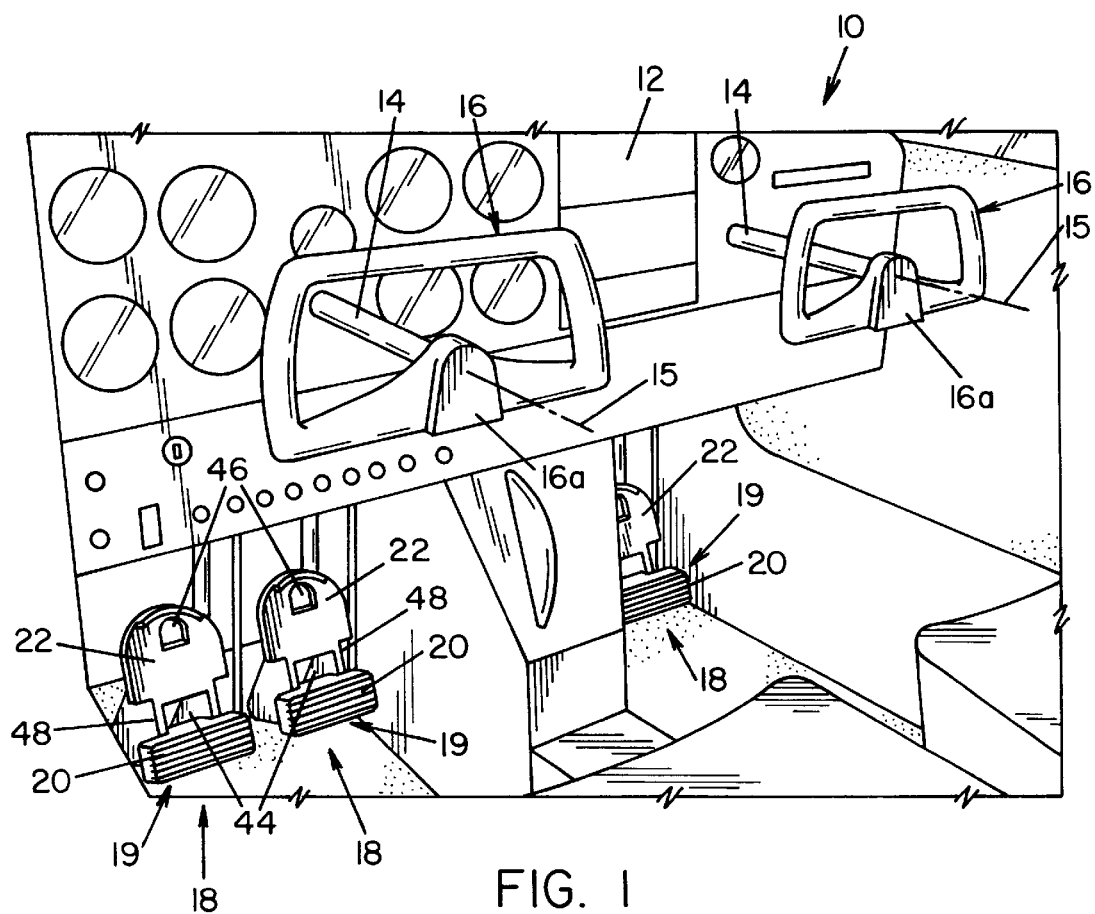
FIG. 1 is a perspective view of the cockpit of an airplane having dual flight control components.

Referring now in greater detail to the drawings wherein the showings are for the purpose of illustrating preferred embodiments of the invention only and not for the purpose of limiting the invention, FIG. 1 illustrates an airplane cockpit 10 having an instrument panel 12 and dual sets of flight control components, each set comprising an elevator control post 14 having an axis 15, an aileron control steering wheel 16, and a pair of rudder-brake control units 18. As will become apparent hereinafter, each unit 18 includes a rudder control lever, a brake control lever and a selectively operable rudder-brake pedal member 19 having a rudder pedal portion 20 and a brake pedal portion 22. Elevator control post 14 is slidable forwardly and rearwardly relative to instrument panel 12 and operates in a well known manner to pivot the elevators on the tail of the aircraft upwardly and downwardly in response to displacement of post 14 rearwardly and forwardly of the instrument panel, respectively. Aileron control steering wheel 16 has a hub 16a and is mounted on post 14 for forward and rearward displacement therewith and, in a well known manner, is pivotal in opposite directions about a steering wheel axis provided by axis 15 of post 14 for controlling the ailerons on the wings of the airplane for banking or rolling the aircraft clockwise or counterclockwise relative to the direction between the front and tail ends of the airplane. As described hereinafter, each pair of pedal members 19 is operable through the rudder pedal portions 20 thereof and corresponding rudder levers to pivot the rudder on the tail of the airplane to the left or right, and such displacement of the rudder together with displacement of the ailerons by pivotal movement of the steering wheel controls turning of the aircraft relative to its direction of travel. Displacement of the elevators upwardly and downwardly respectively controls climbing and descent of the airplane in the direction of movement thereof. As also described hereinafter, each pair of pedal members 19 is operable through brake pedal portions 22 thereof and corresponding brake levers to control the operation of brakes for the wheels of the airplane.

Figure 2:
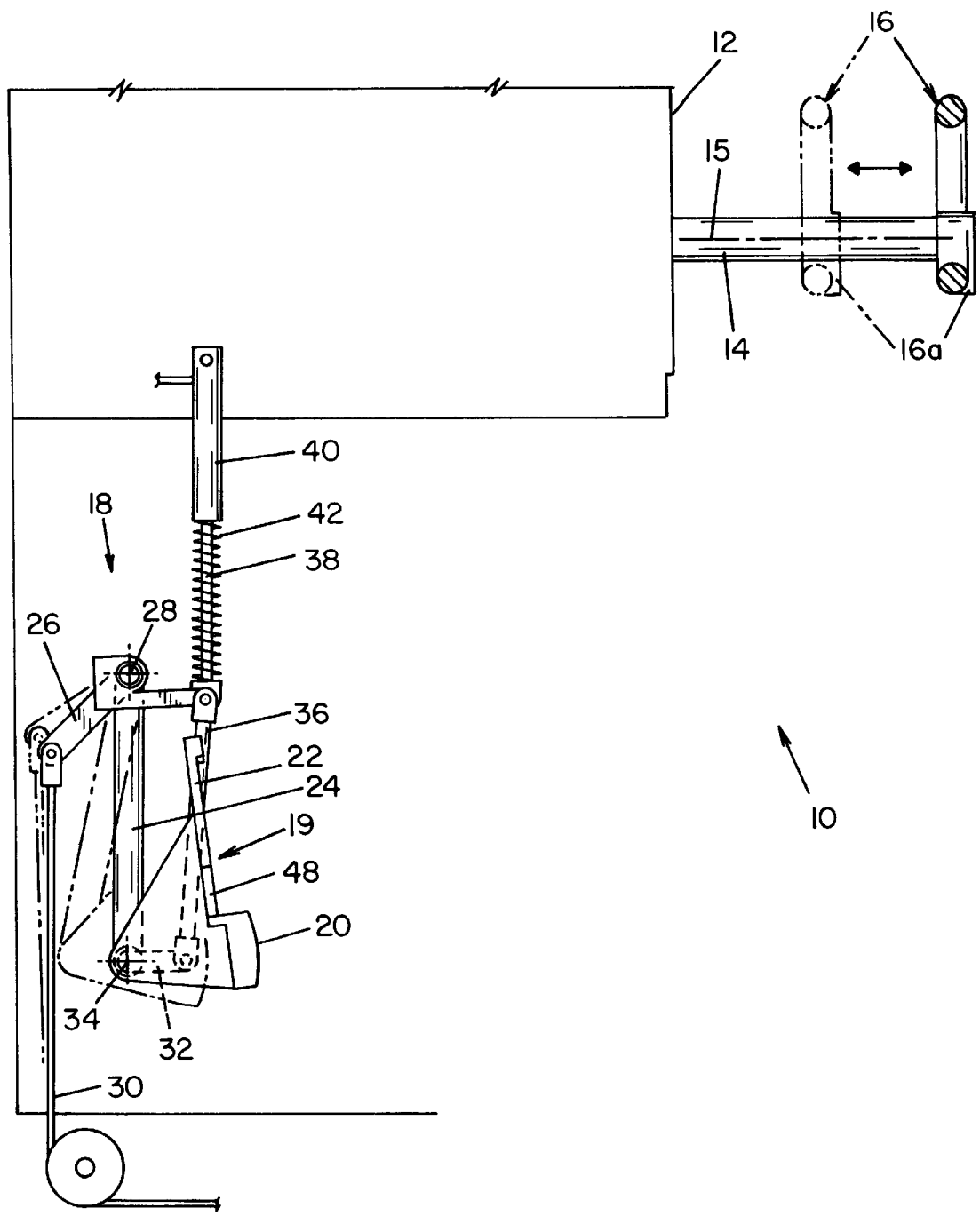
FIG. 2 is an elevation view of the cockpit somewhat schematically illustrating the operative positions of the rudder controlling and elevator controlling flight control components.

Referring now to FIG. 2 in conjunction with FIG. 1, it will be appreciated that elevator control posts 14 and the aileron controlling steering wheels 16 which are attached thereto are displaceable forwardly and rearwardly in cockpit 1 0 relative to instrument panel 12 and have a rearwardmost position as shown in solid line and a forwardmost position as shown by broken lines. Similarly, the rudder-brake pedal members 19 which are located in the cockpit forwardly of and below the elevator and aileron control components are each pivotal between a rearwardmost position shown in solid line and a forwardmost position shown in broken lines for controlling displacement of the rudder. More particularly, in this respect, and as somewhat schematically illustrated in FIG. 2, each rudder-brake pedal member 19 is pivotally mounted at its lower end to the lower end of a rudder control lever having arms 24 and 26 connected together and mounted on fixed support structure in the cockpit for pivotal displacement in opposite directions about a rudder lever axis 28. Arm 26 is connected to a cable 30 leading to the rudder and by which the latter is displaced in response to depressing rudder pedal portion 20 to pivotally displace the rudder-brake pedal member and arms 24 and 26 from the solid to the broken line positions thereof.

As mentioned above, each rudder-brake pedal member 19 is also operable to control a wheel brake of the airplane. In this respect, the lower end of the rudder-brake pedal member is connected to the lower end of lever arm 24 together with a brake control lever 32 for pedal member 19 and brake lever 32 to be in opposite directions about a brake lever axis 34. The outer end of arm 32 is pivotally connected to a brake actuating rod 36 which is pivotally connected to the outer end of the piston rod 38 of a brake master cylinder 40. A spring 42 biases piston rod 38 downwardly and thus rudder-brake pedal member 19 to pivot clockwise about brake pedal axis 34. As will be appreciated from the foregoing description, during taxiing and flying of the aircraft, the pilot operates a pair of the rudder-brake pedal members 19 by pushing on the rudder pedal portions 20 thereof to pivot the rudder control levers about pivot axes 28 to control the position of the rudder. During landing of the aircraft, the pilot pushes on brake pedal portions 22 of the rudder-brake pedal members to pivot brake levers 32 counterclockwise about brake lever axes 34 to displace rods 36 and 38 upwardly so as to pressurize fluid in the corresponding master cylinder 40 to brake movement of the aircraft along the ground.

The structure and contours of the rudder-brake pedal members vary from one aircraft manufacturer to another but, generally, have a configuration which provides openings or recesses to facilitate interengagement thereof with an anti-theft device in the manner described hereinafter. In any event, it will be appreciated that the rudder-brake pedal members of a given aircraft can be replaced or modified for the latter purpose if necessary. In the embodiment illustrated in FIGS. 1 and 2, each of the rudder-brake pedal members 19 is provided with an opening 44 between the rudder and brake pedal portions 20 and 22 thereof, with an opening 46 adjacent the upper end of brake pedal portion 22, and with outwardly open recesses 48 in the laterally opposite sides thereof between the rudder and brake pedal portions 20 and 22.

In accordance with the present invention, an anti-theft device is provided which is interengageable with two flight control components in the cockpit of an airplane to preclude flying thereof. In connection with an airplane having dual sets of flight control components, the anti-theft device is selectively connectable between the aileron controlling steering wheels of the two sets, or between the rudder-brake pedal member and the steering yoke as defined by the elevator control post and aileron control wheel of one of the sets of controls. In an aircraft having a single set of the three flight control components, the anti-theft device is adapted to be interengaged with the rudder-brake pedal and the steering yoke. As will become apparent hereinafter, when the anti-theft device is interconnected between aileron controlling steering wheels, it engages the laterally outer sides of each of the wheels to preclude rotation thereof and thus the displacement of the ailerons necessary to fly the aircraft, and when the anti-theft device is between the rudder-brake pedal member and the steering yoke, it engages the rudder-brake pedal member selectively in one of two positions thereof and the control post in its rearwardmost position in the cabin. The latter precludes displacement of the elevators of the aircraft as is necessary to fly the airplane and, as will become apparent hereinafter, one of the positions of the rudder-brake pedal member precludes displacement of the rudder and the other applies the brake to one of the wheels of the airplane.

One embodiment of an anti-theft device mountable in the foregoing manner for precluding the flight of an airplane is shown in FIGS. 3–6 of the drawing and designated generally by the numeral 50. Anti-theft device 50 has an axis A and comprises a pair of arm members 52 and 54 respectively having inner ends 52a and 54a and outer ends 52b and 54b. Member 52 is tubular and member 54 is a rod which is adapted to be slidably received in member 52 so that the members are extendable and retractable relative to one another and, as will become apparent hereinafter, between mounted and dismounted positions relative to flight control components in the cockpit of an aircraft. The outer end of member 52 terminates in an axially outwardly open U-shaped hook 56 having legs 58 and 60 which are of the same length, parallel to one another and interconnected by a bridging portion 62 therebetween. Leg 58 is substantially coaxial with axis A, whereby leg 60 is laterally offset therefrom. The outer end of rod member 54 terminates in an axially outwardly open U-shaped hook 64 having legs 66 and 68 parallel to one another and spaced apart by a bridging portion 70 therebetween. Leg 66 is coaxial with axis A, whereby leg 68 is laterally offset therefrom, and leg 68 is axially shorter than leg 66 for the purpose set forth hereinafter.

Figure 5:
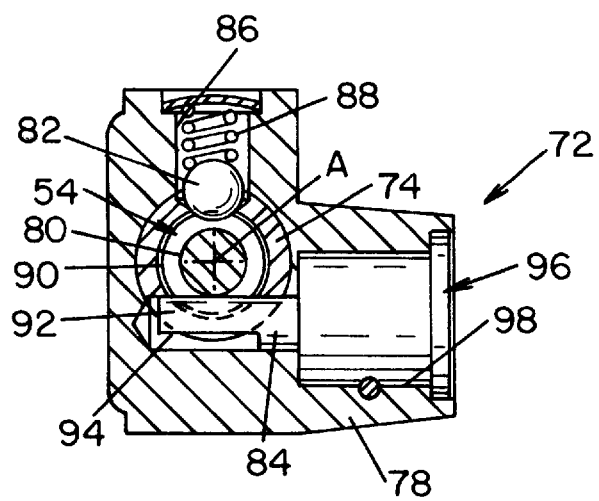
FIG. 5 is a cross-sectional elevation view taken along line 5—5 in FIG. 3.
Figure 6:
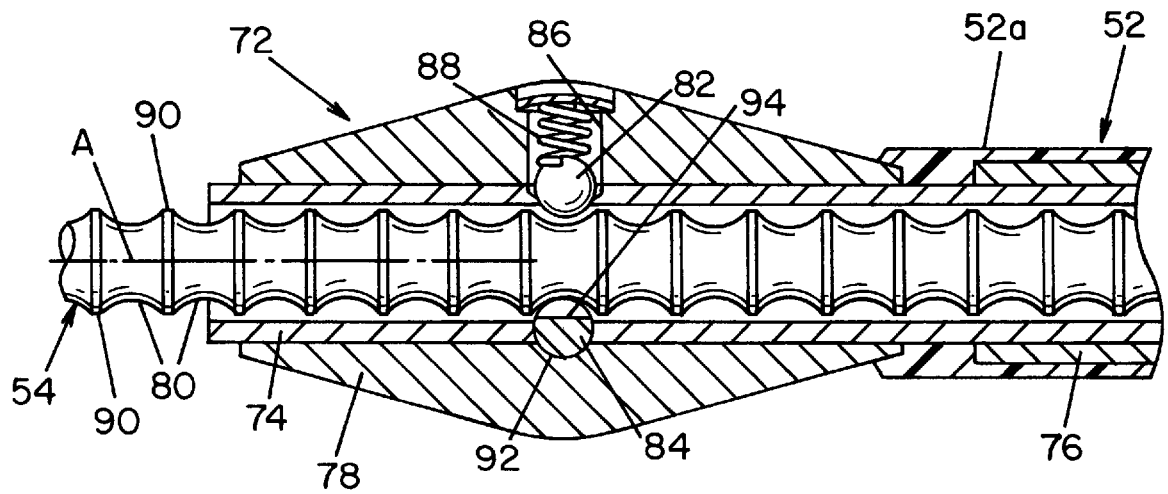
FIG. 6 is a sectional elevation view of a portion of the anti-theft device taken along line 6—6 in FIG. 3.

A locking mechanism 72 is mounted on inner end 52a of member 52 for interengagement with rod member 54 so as to releasably hold members 52 and 54 in the mounted position thereof relative to the flight control components of an airplane. Preferably, as best seen in FIGS. 5 and 6, tubular member 52 includes an inner tube 74 of steel and an outer tube 76 of steel beyond which tube 74 extends to receive housing 78 of lock mechanism 72. Accordingly, tube 74 provides a passageway through the lock housing for rod member 54 which is also of steel. Rod 54 is provided along a substantial portion of its length with annular grooves 80 transverse to axis A, and housing 78 supports a spherical steel ball 82 adapted to engage in a groove 80 to locate rod 54 relative to a locking member 84 in the lock housing. More particularly in this respect, the lock housing is provided with a bore 86 for ball 82 and which bore opens into the passageway provided by tube 74 and is restricted at its inner end so as to support ball 82 so that the radially inner side thereof projects into the passageway. A spring 88 biases ball 82 radially inwardly of tube 74, and the ridges 90 between adjacent grooves 80 bias the ball radially outwardly into bore 86 when rod 54 is displaced axially into tube 74. Locking member 84 is generally cylindrical in cross-section and includes an arcuate outer surface 92 and a flat portion 94. Surface 92 is of a diameter generally corresponding to that of the semi-circular grooves 80, and a key-operated tubular 96 is provided in a bore 98 in housing 78 for turning locking member 84 to alternately position arcuate outer surface 92 in a groove 80 as shown in FIG. 5 and with flat 94 facing radially inwardly of rod 54 as shown in FIG. 6. In the latter position, rod 54 is axially slidably inwardly and outwardly of member 52, and when locking member 84 is turned for arcuate outer surface 92 to engage in a groove 80, rod 54 is locked against axial displacement relative to member 52. Accordingly, it will be appreciated that locking member 84 has locked and unlocked positions relative to rod 54 and that the two positions are controlled by a key.

Figure 7:
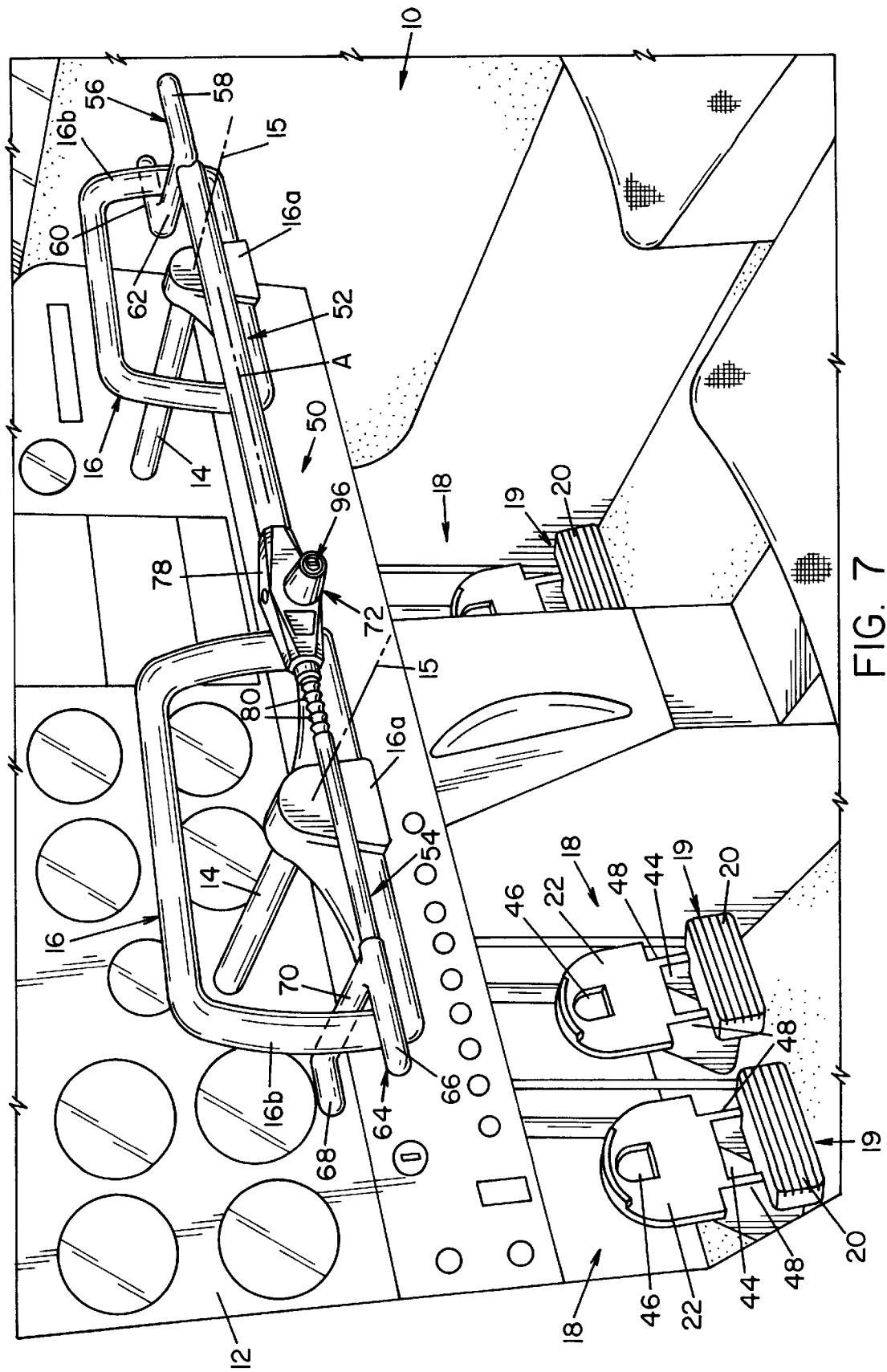
FIG. 7 is a perspective view of the cockpit showing an anti-theft device in accordance with the invention interengaging with the aileron control steering wheels of the aircraft.
Figure 8:
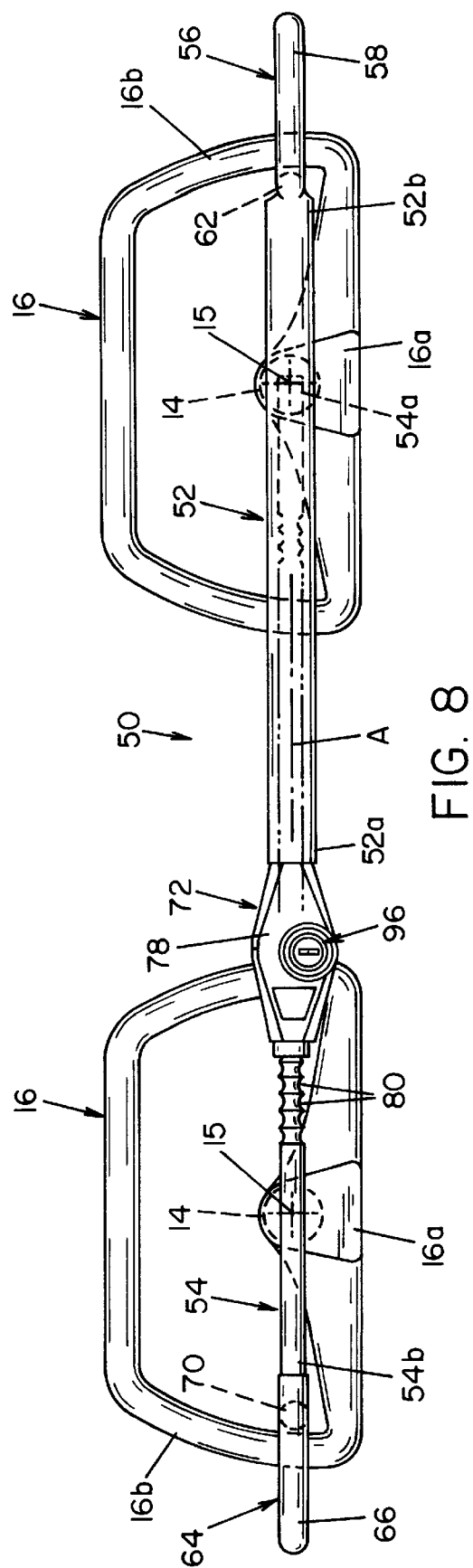
FIG. 8 is a front elevation view of the steering wheel components and anti-theft device shown in FIG. 7.

Referring now to FIGS. 7 and 8 of the drawing, anti-theft device 50 is shown mounted between steering wheels 16 in cockpit 10 of the aircraft as described hereinabove in connection with FIG. 1, whereby the steering wheels are interengaged against the rotation thereof necessary to control the ailerons of the aircraft for flying the same. More particularly in this respect, steering wheels 16 have laterally outer sides 16b relative to one another, each of which receives one of the hooks 56 and 64 of the anti-theft device. It will be appreciated that member 54 is initially displaced axially inwardly of member 52 to space hooks 56 and 64 such that ends 16b of the steering wheels can be received therein, and that rod member 54 is then extended relative to member 52 to the mounted position shown in FIG. 7 in which the laterally outer ends of the steering wheels are captured in the hooks. Lock mechanism 72 is then manipulated to lock rod 54 and tube 52 in the mounted position, whereby rod 54 cannot be displaced into tube 52 until such time as the lock mechanism is operated to unlock the component parts for such movement. It will be appreciated that when the anti-theft device is mounted between the steering wheels as shown in FIGS. 7 and 8 neither steering wheel can be rotated about its axis sufficiently to enable control of the ailerons as is necessary for flying the airplane. Further, while the steering wheels and anti-theft device are shown in generally horizontal dispositions in FIG. 8, it will be appreciated that, depending on the contour and structure of the steering wheels, the latter can be pivoted slightly about their axes of rotations to positions providing other orientations of the steering wheels and the anti-theft device relative to one another.

Figure 9:
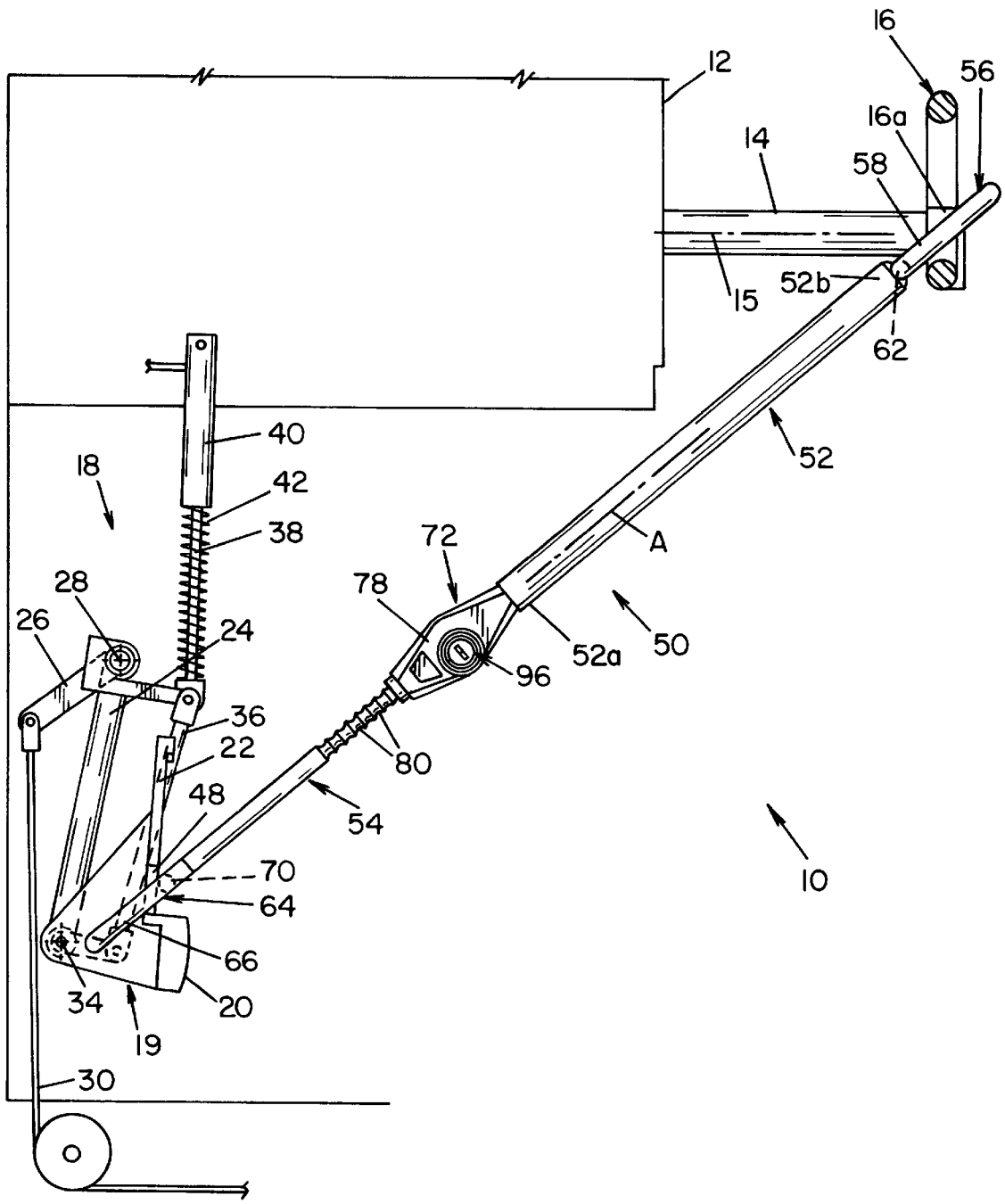
FIG. 9 is a side elevation view, partially in section, somewhat schematically illustrating the anti-theft device engaged between the steering yoke and the rudder-brake pedal of the aircraft for pinning the rudder against displacement.

FIG. 9 illustrates an alternative arrangement for mounting anti-theft device 50 in an aircraft having dual sets of flight control components, and a mounting arrangement which is applicable to an aircraft having a single set of flight control components. In this respect, anti-theft device 50 is mounted between one of the rudder-brake pedal members 19 and the juncture between elevator control post 14 and 16a of the corresponding steering wheel 16 with hooks 56 and 64 respectively receiving the steering yoke components and rudder-brake pedal member 19. As will be appreciated from FIG. 2 and the description thereof herein, pedal member 19 is pivoted about rudder lever axis 28 for the rudder control lever 24 to be in its forwardmost position. The legs of hook 64 are received in recesses 48 on the opposite sides of pedal member 19, whereby bridging portion 70 engages against the pedal member between rudder and brake pedal portions 20 and 22 to hold rudder control lever 24 in its forwardmost position. The legs of hook 56 receive the steering wheel hub and elevator control post therebetween, whereby bridging portion 62 engages against the hub to position the elevator control post in the rearwardmost position thereof. It will be appreciated that members 52 and 54 of the anti-theft device are initially retracted relative to one another as is necessary to position the legs of hook 64 for entry into recesses 48 of the pedal member and the legs of hook 56 to receive post 14 and the hub of wheel 16. In conjunction with such positioning, members 52 and 54 are extended relative to one another to the mounting position relative to the pedal, post and steering wheel components after which lock mechanism 72 is actuated to releasably lock members 52 and 54 in the mounted position thereof. As will be appreciated from FIG. 9, when anti-theft device 50 is mounted in the foregoing manner, rudder lever member 24 and the elevator control post are held against displacement from the positions shown, thus to preclude flying of the airplane.

Figure 10:
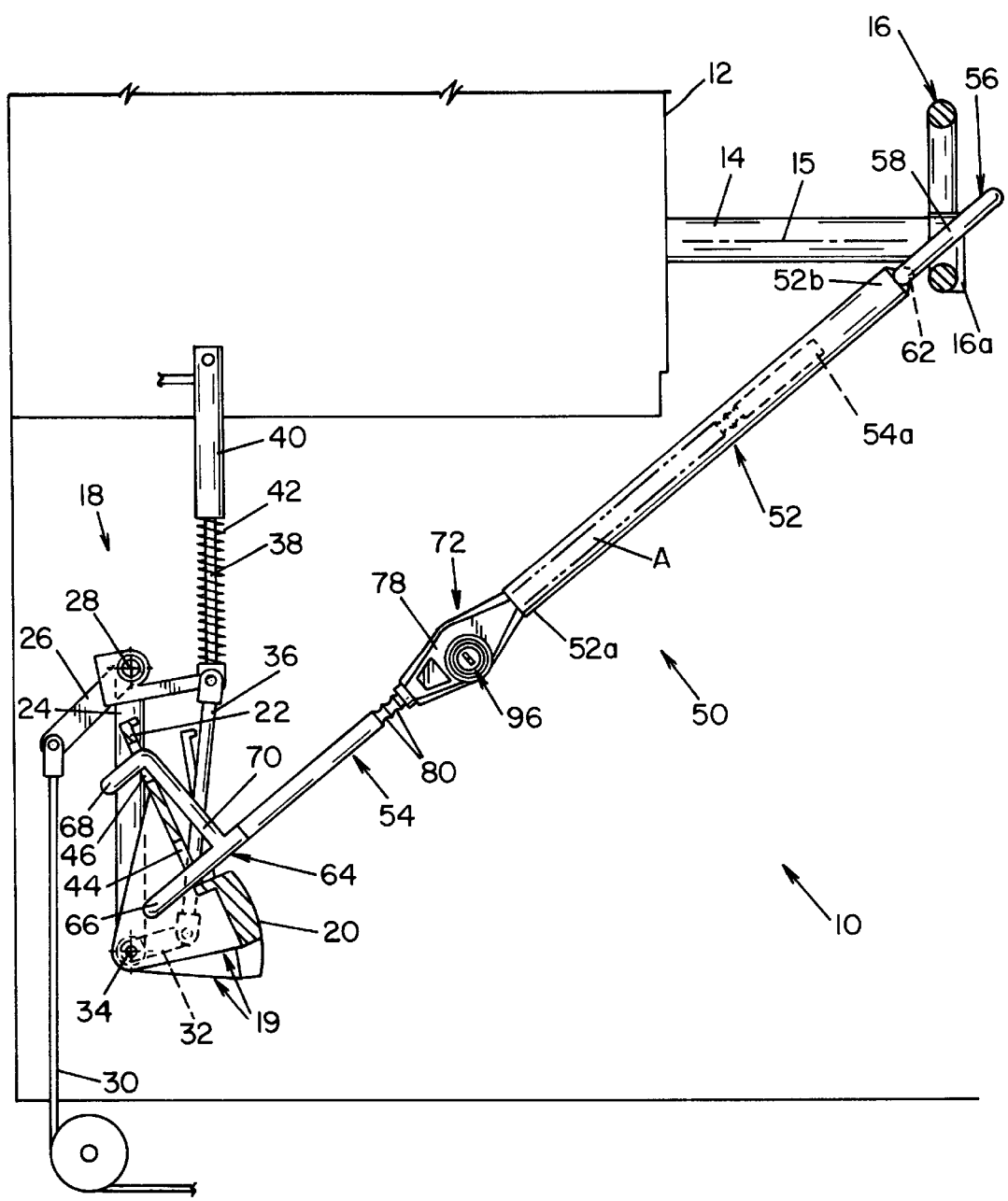
FIG. 10 is a side elevation view, partially in section, somewhat schematically illustrating the anti-theft device engaged between the steering yoke and the rudder-brake pedal of the aircraft for applying the brake to one of the wheels of the aircraft.
Figure 11:
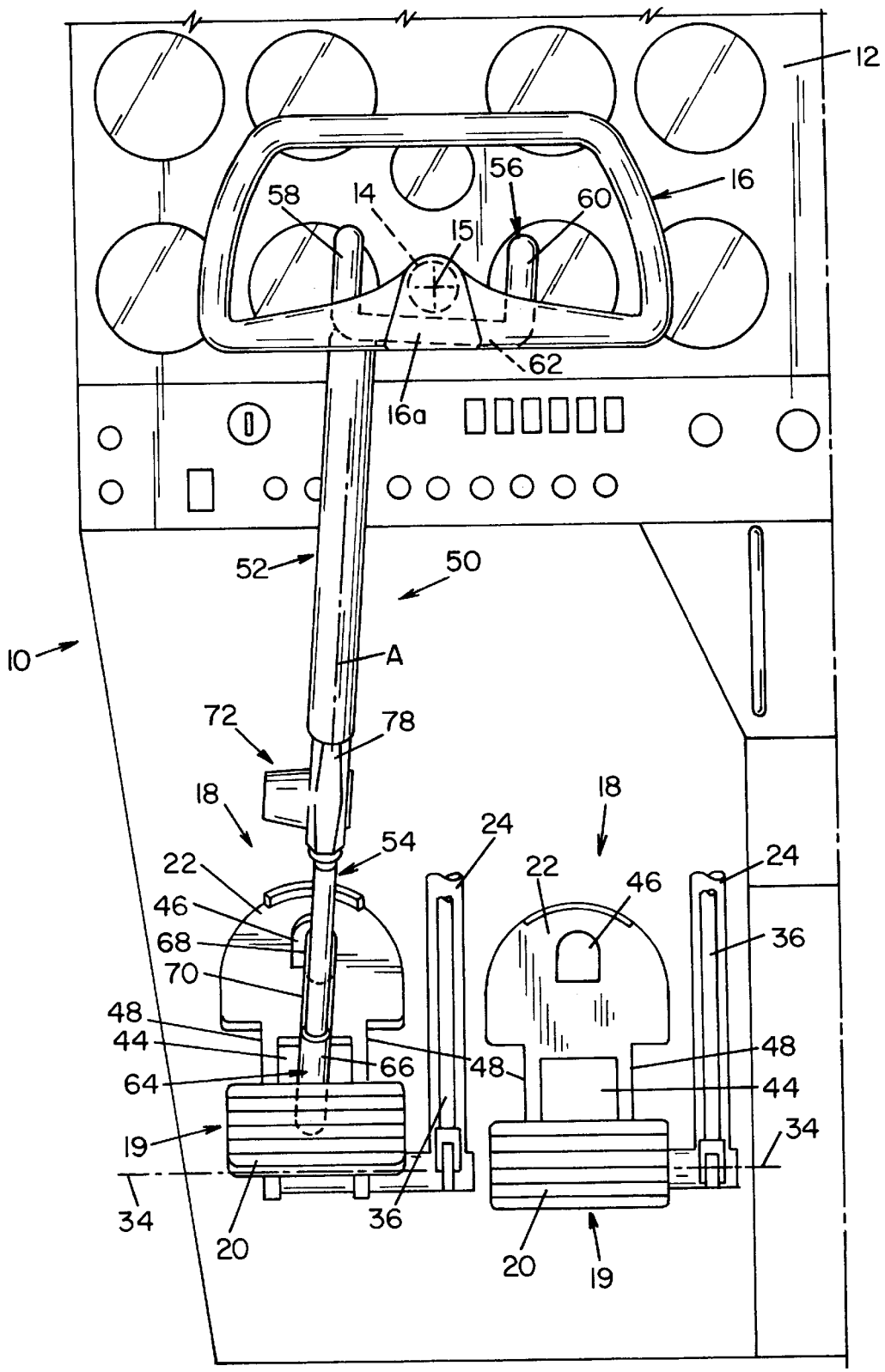
FIG. 11 is a front elevation view of the arrangement shown in FIG. 10 looking in the direction from right to left in the latter figure.

FIGS. 10 and 11 illustrate a modification of the mounting arrangement shown in FIG. 9 and in which the rudder-brake pedal member 19 is engaged in the second of the two selective positions thereof, whereby the elevator control post and one of the wheel brakes of the airplane are held in positions which preclude flying the airplane. In FIGS. 10 and 11, hook 64 of the anti-theft device is rotated 90° from the position shown in FIG. 9, whereby legs 66 and 68 of the hook respectively to extend through openings 44 and 46 in brake pedal portion 22 of pedal member 19. Further, bridging portion 70 of the hook engages against brake pedal portion 22 so as to pivot pedal member 19 counterclockwise about brake lever axis 34 to displace rod 36 and thus piston rod 38 upwardly relative to master cylinder 40 to engage the corresponding wheel brake of the airplane. Accordingly, an effort to move the airplane on the ground results in the airplane pivoting about the locked wheel. At the same time, as described hereinabove in connection with FIG. 9, hook 56 of the anti-theft device engages elevator control post 14 and steering wheel hub 16a to hold post 14 in the rearwardmost position thereof to preclude displacement of the elevators as is necessary to fly the airplane. As will be further appreciated from FIG. 10, should a would-be thief attempt to disengage anti-theft device 50 by pushing on rudder pedal portion 20 of rudder-brake pedal member 19 to displace rudder lever 24 clockwise about rudder lever axis 28, leg 66 of hook 64 is of a length which will preclude separation thereof from the pedal member.

Figure 12:
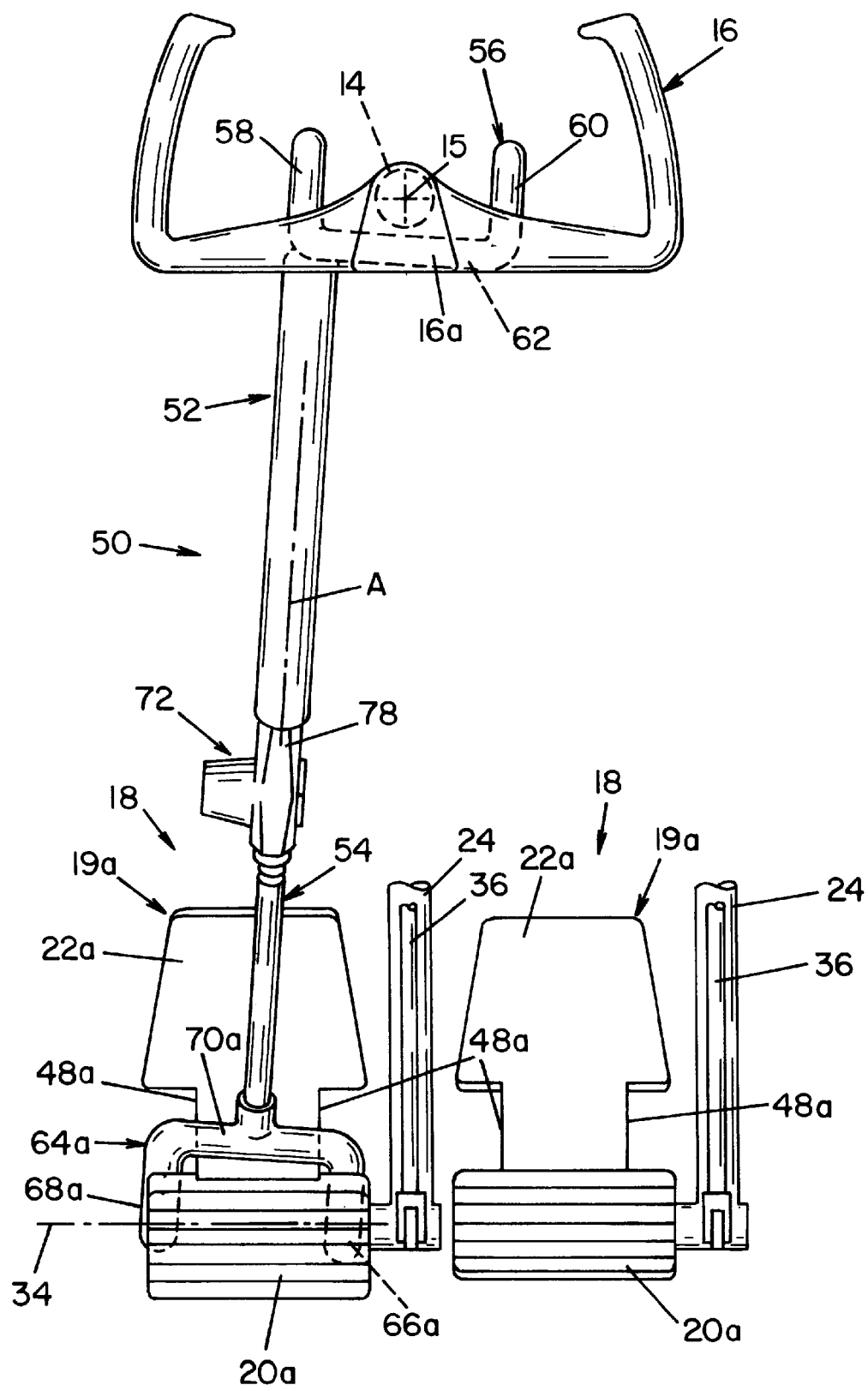
FIG. 12 is a view similar to FIG. 1 and showing another embodiment of an anti-theft device according to the invention.

FIG. 12 illustrates a modification of one of the hook members of the anti-theft device and the mounting of the latter as described hereinabove in connection with FIG. 9. Other than for the hook modification, the anti-theft device is as described hereinabove in connection with FIGS. 3–6, whereby like parts are identified by like numerals in the latter figures and in FIG. 12. With reference to the latter figures, the modified hook which is represented in general by the numeral 64a differs from hook 64 described hereinabove by providing for bridging portion 70a to be connected to rod member 54 intermediate the opposite ends of the bridging portion. Further, legs 66a and 68a at the outer ends of bridging portion 70a are parallel to one another and of the same length relative to the bridging portion. It will be appreciated that hook 64a can interengage with a pedal member 19 as illustrated and described hereinabove in connection with FIGS. 1 and 9–11, or with a pedal member 19a which is similar thereto but only has recesses 48a in the laterally opposite sides thereof for receiving the legs of the hook. As mentioned hereinabove, the structure and design of the rudder-brake pedal member for aircraft vary from one manufacturer to another, and it will be appreciated from the illustrations and description herein that one or the other of the hook members of the anti-theft device and/or the rudder-brake pedal member of a given airplane can be modified to accommodate one another in connection with interengaging flight control components of the airplane so as to preclude the displacement thereof necessary for flying the airplane.

FIGS. 13 and 14 illustrate further modifications of the outwardly open U-shaped hooks at the opposite ends of an anti-theft device 50 which, other than for the modified hooks, corresponds in structure to the anti-theft device described hereinabove in connection with the FIGS. 3–6. Accordingly, like parts identified by like numerals in the latter figures and in FIGS. 13 and 14. With reference to the latter figures, outer end 52b of arm member 52 terminates in an outwardly open U-shaped hook 100 similar to hook 64a described hereinabove in connection with FIG. 12. In this respect, hook 100 has legs 102 and 104 which are of the same length, parallel to one another and interconnected by a bridging portion 106 which is connected to arm member 52 intermediate the opposite ends of the bridging portion. Outer end 54b of rod member 54 terminates in an outwardly open U-shaped hook 108 which is similar to hook 56 in the preceding embodiments. In this respect, hook 108 has legs 110 and 112 which are of the same length, parallel to one another and interconnected by a bridging portion 114 therebetween. Leg 112 is coaxial with axis A of the anti-theft device, whereby leg 110 is laterally offset therefrom. It will be appreciated from the embodiments of the anti-theft device described hereinabove that the anti-theft device illustrated in FIGS. 13 and 14 can be interengaged between flight control components in the same manner as for the other embodiments.

While considerable emphasis has been placed herein on the structures of preferred embodiments of the anti-theft device, it will be appreciated that other embodiments can be devised and that modifications of the preferred embodiments can be made without departing from the principals of the invention. Accordingly, it is to be distinctly understood that the foregoing descriptive matter is to be interpreted merely as illustrative of the invention and not as a limitation.

Having thus described the invention, it is so claimed:

1. An anti-theft device in combination with an aircraft having elevators, ailerons, a rudder, brakes, a cockpit, and first, second and third flight control components mounted in said cockpit for movement relative to the aircraft for respectively controlling said ailerons, said elevators and said rudder and said brakes with respect to flying the aircraft, said anti-theft device having an axis and comprising just two arm members including a first arm member and a second arm member each having axially inner and outer ends, said inner ends being telescopically interengaged directly with one another for displacement of said arm members between mounted and dismounted positions relative to said flight control components, the outer end of each arm member terminating in an axially outwardly open U-shaped hook, each said hook in said mounted position receiving a different one of two of said first, second and third flight control components therein for holding the two components against movement relative to said aircraft for flying thereof, the hooks in said dismounted position disengaging said two components for movement relative to said aircraft for enabling flying thereof, and lock means releasably holding said arm members in the mounted position thereof.

2. The combination according to claim 1, wherein each said U-shaped hook includes a pair of legs and a bridging portion therebetween, one of the legs of at least one of the hooks being generally coaxial with the corresponding one of said first and second arm members.

3. The combination according to claim 1, wherein each said U-shaped hook includes a pair of legs and a bridging portion therebetween, one of the legs of one of the hooks being generally coaxial with the corresponding one of the first and second arm members, the other of said first and second arm members being connected to the bridging portion of the other hook generally centrally between the legs of said other hook.

4. The combination according to claim 1, wherein said first arm member is tubular and said second arm member is a rod slidably received in said first member, said lock means including key operated latch means on said first arm member and keeper means on said second arm member interengaging with said latch means.

5. The combination according to claim 4, wherein said lock means includes a lock housing and said latch means includes a semi-circular latch member in said housing and axially adjacent annular recesses in said rod for receiving said latch member, and a key operated tumbler having locked and unlocked conditions respectively positioning said latch member in a recess and releasing the latch member from the recess.

6. The combination according to claim 1, wherein said first flight control component includes an elevator control post displaceable in opposite directions forwardly and rearwardly of said aircraft, said second flight control component includes a steering wheel on said post, and said third flight control component includes a rudder-brake pedal selectively pivotal about first and second axes transverse to said opposite directions, said steering wheel being supported on said post for rotation about a steering wheel axis transverse to said first and second axes, and said first and second axes being spaced below said steering wheel axis and forwardly of said steering wheel, said steering wheel including a hub for attaching said steering wheel to an end of said control post, one of said hooks receiving said post and said hub, and the other of said hooks receiving said rudder-brake pedal at a location spaced from said first and second axes.

7. The combination according to claim 6, wherein each said U-shaped hook includes a pair of legs and a bridging portion therebetween, one of the legs of at least one of the hooks being generally coaxial with the corresponding one of said first and second arm members.

8. The combination according to claim 7, wherein said first arm member is tubular and said second arm member is a rod slidably received in said first member, said lock means including key operated latch means on said first arm member and keeper means on said second arm member interengaging with said latch means.

9. The combination according to claim 8, wherein said lock means includes a lock housing and said latch means includes a semi-circular latch member in said housing and axially adjacent annular recesses in said rod for receiving said latch member, and a key operated tumbler having locked and unlocked conditions respectively positioning said latch member in a recess and releasing the latch member from the recess.

10. The combination according to claim 6, wherein each said U-shaped hook includes a pair of legs and a bridging portion therebetween, one of the legs of one of the hooks being generally coaxial with the corresponding one of the first and second arm members, the other of said first and second arms being connected to the bridging portion of the other hook generally centrally between the legs of said other hook.

11. The combination according to claim 10, wherein said first arm member is tubular and said second arm member is a rod slidably received in said first member, said lock means including key operated latch means on said first arm member and keeper means on said second arm member interengaging with said latch means.

12. The combination according to claim 11, wherein said lock means includes a lock housing and said latch means includes a semi-circular latch member in said housing and axially adjacent annular recesses in said rod for receiving said latch member, and a key operated tumbler having locked and unlocked conditions respectively positioning said latch member in a recess and releasing the latch member from the recess.

13. The combination according to claim 1, wherein said two flight control components include an elevator control post displaceable in opposite directions forwardly and rearwardly of said aircraft, and a selectively operable rudder and brake control unit including a rudder-brake pedal selectively pivotal about one of rudder lever and brake lever axes transverse to said direction for respectively controlling said rudder and said brakes, said control post having a rearwardmost position in said cockpit and said rudder-brake pedal having first and second forwardmost positions in said cockpit relative respectively to said rudder lever and brake lever axes, one of said hooks engaging said control post in said rearwardmost position thereof and the other of said hooks engaging said rudder-brake pedal in one of first and second forwardmost positions thereof when said arm members are in said mounted position thereof for precluding movement of said control post and said rudder-brake pedal respectively from said rearwardmost and said one forwardmost position.

14. The combination according to claim 13, wherein each said U-shaped hook includes a pair of legs and a bridging portion therebetween, one of the legs of at least one of the hooks being generally coaxial with the corresponding one of said first and second arm members.

15. The combination according to claim 14, wherein said first arm member is tubular and said second arm member is a rod slidably received in said first member, said lock means including key operated latch means on said first arm member and keeper means on said second arm member interengaging with said latch means.

16. The combination according to claim 15, wherein said lock means includes a lock housing and said latch means includes a semi-circular latch member in said housing and axially adjacent annular recesses in said rod for receiving said latch member, and a key operated tumbler having locked and unlocked conditions respectively positioning said latch member in a recess and releasing the latch member from the recess.

17. The combination according to claim 13, wherein each said U-shaped hook includes a pair of legs and a bridging portion therebetween, one of the legs of one of the hooks being generally coaxial with the corresponding one of the first and second arm members, the other of said first and second arm member being connected to the bridging portion of the other hook generally centrally between the legs of said other hook.

18. The combination according to claim 17, wherein said first arm member is tubular and said second arm member is a rod slidably received in said first member, said lock means including key operated latch means on said first arm member and keeper means on said second arm member interengaging with said latch means.

19. The combination according to claim 18, wherein said lock means includes a lock housing and said latch means includes a semi-circular latch member in said housing and axially adjacent annular recesses in said rod for receiving said latch member, and a key operated tumbler having locked and unlocked conditions respectively positioning said latch member in a recess and releasing the latch member from the recess.

20. An anti-theft device in combination with an aircraft having elevators, ailerons, a rudder brakes, a cockpit, and first, second and third flight control components mounted in said cockpit for movement relative to the aircraft for respectively controlling said ailerons, said elevators and said rudder and said brakes with respect to flying the aircraft, said anti-theft device having an axis and comprising just two arm members including a first arm member and a second arm member each having axially inner and outer ends, said inner ends being telescopically interengaged directly with one another for displacement of said arm members between mounted and dismounted positions relative to said flight control components, the outer end of each arm member terminating in an axially outwardly open U-shaped hook, each said hook in said mounted position receiving a different one of two of said first second and third flight control components therein for holding the two components against movement relative to said aircraft for flying thereof, the hooks in said dismounted position disengaging said two components for movement relative to said aircraft for enabling flying thereof, and lock means releasably holding said arm members in the mounted position thereof, wherein said first flight control component includes an elevator control post displaceable in opposite directions forwardly and rearwardly of said aircraft, said second flight control component includes a steering wheel on said post, and said third flight control component includes a rudder-brake pedal selectively pivotal about first and second axes transverse to said opposite directions, said steering wheel being supported on said post for rotation about a steering wheel axis transverse to said first and second axes, and said first and second axes being spaced below said steering wheel axis and forwardly of said steering wheel, said steering wheel including a hub for attaching said steering wheel to an end of said control post, one of said hooks receiving said post and said hub, and the other of said hooks receiving said rudder-brake pedal at a location spaced from said first and second axes and, said rudder-brake pedal includes a pair of openings therethrough and the other of said hooks includes a pair of legs extending through said openings.

21. An anti-theft device in combination with an aircraft having elevators, ailerons a rudder, brakes, a cockpit, and first, second and third flight control components mounted in said cockpit for movement relative to the aircraft for respectively controlling said ailerons, said elevators and said rudder and said brakes with respect to flying the aircraft, said anti-theft device having an axis and comprising just two arm members including a first arm member and a second arm member each having axially inner and outer ends, said inner ends being telescopically interengaged directly with one another for displacement of said arm members between mounted and dismounted positions relative to said flight control components, the outer end of each arm member terminating in an axially outwardly open U-shaped hook, each said hook in said mounted position receiving a different one of two of said first, second and third flight control components therein for holding the two components against movement relative to said aircraft for flying thereof, the hooks in said dismounted position disengaging said two components for movement relative to said aircraft for enabling flying thereof, and lock means releasably holding said arm members in the mounted position thereof, wherein said two flight control components are first and second steering wheels in said cockpit respectively rotatable about first and second steering wheel axes for controlling said ailerons, said axes being parallel and laterally spaced apart from one another, said steering wheels including laterally inner and laterally outer hand grip portions relative to one another, and each of said hooks in the mounted position of said arm members receiving the outer hand grip portion of a different one of said steering wheels for precluding rotation of said steering wheels about said steering wheel axes.

22. The combination according to claim 21, wherein each said U-shaped hook includes a pair of legs and a bridging portion therebetween, one of the legs of at least one of the hooks being generally coaxial with the corresponding one of said first and second arm members.

23. The combination according to claim 22, wherein one of the legs of each of the hooks is coaxial with the corresponding one of said first and second arm members.

24. The combination according to claim 23, wherein said first arm member is tubular and said second arm member is a rod slidably received in said first member, said lock means including key operated latch means on said first arm member and keeper means on said second arm member interengaging with said latch means.

25. The combination according to claim 24, wherein said lock means includes a lock housing and said latch means includes a semi-circular latch member in said housing and axially adjacent annular recesses in said rod for receiving said latch member, and a key operated tumbler having locked and unlocked conditions respectively positioning said latch member in a recess and releasing the latch member from the recess.

* * * * *